INVENTOR.
L. W. Pollock

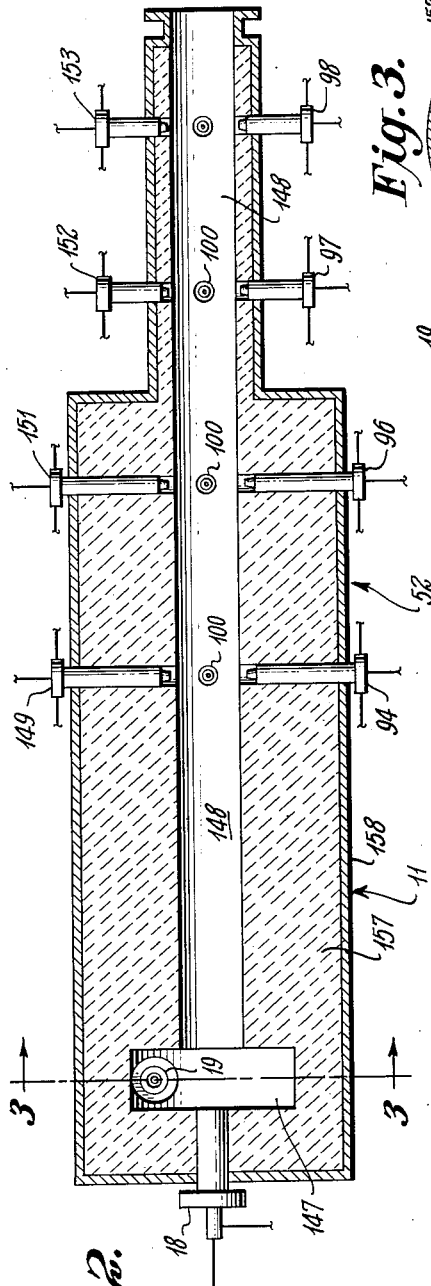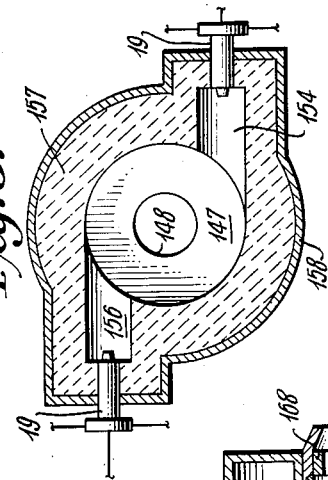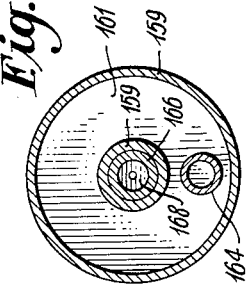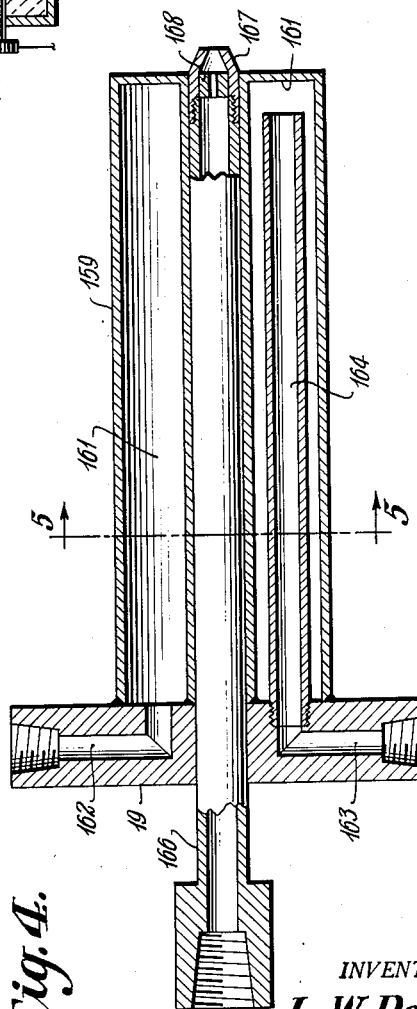

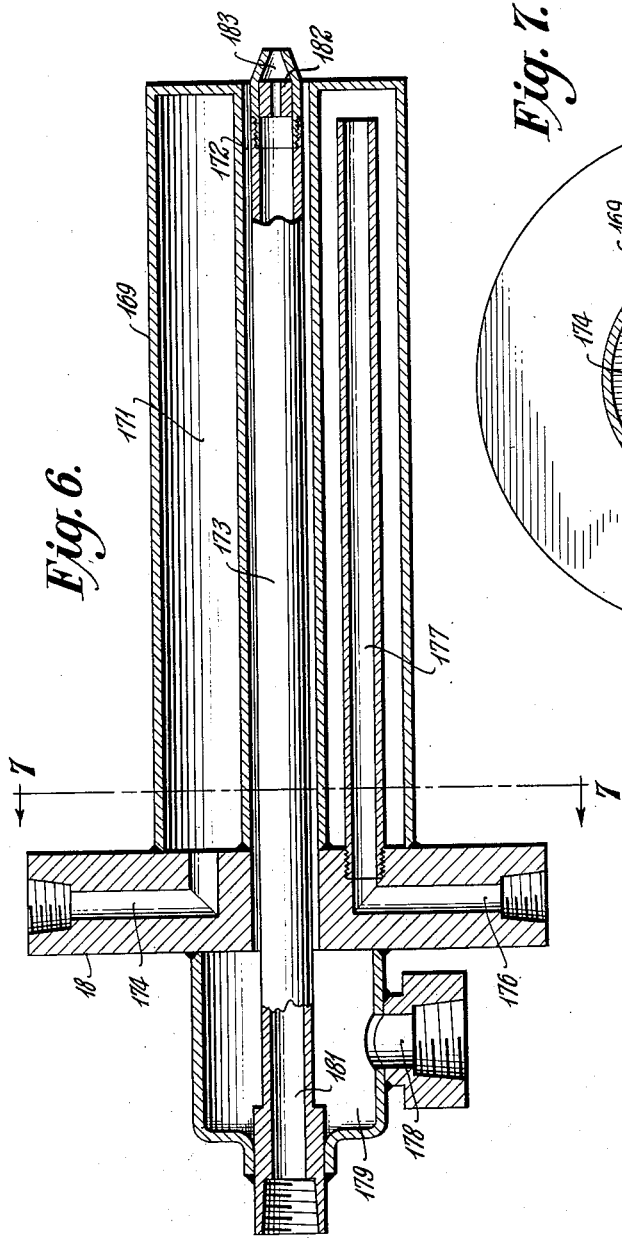
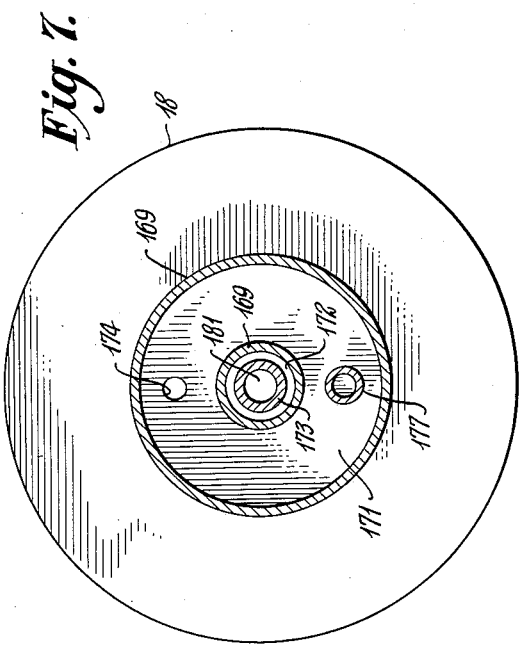
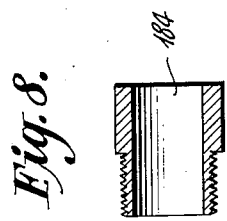

United States Patent Office 2,796,327
Patented June 18, 1957

2,796,327
PROCESS FOR PRODUCING CARBON BLACK, ACRYLONITRILE AND HYDROGEN CYANIDE

Lyle W. Pollock, Bartlesville, Okla., assignor to Phillips Petroleum Company, a corporation of Delaware Application August 21, 1953, Serial No. 375,632

12 Claims. (Cl. 23—151)

This invention relates to apparatus and processes for producing carbon black, acrylonitrile and hydrogen cyanide in the same process. In another aspect it relates to apparatus and processes for producing carbon black and hydrogen cyanide in the same process. In another aspect, it relates to processes of producing acrylonitrile and/or hydrogen cyanide by injecting into the effluent smoke of a furnace carbon black process an ammonia containing fluid.

In the prior art of producing carbon black by the furnace process as described in many patents such as Ayers Reissue 22,886 of June 3, 1947; Krejci 2,375,795 of May 15, 1945; Krejci 2,564,700 of August 21, 1951; Lewis 1,669,618 of May 15, 1928 and Miller 1,807,321 of May 26, 1931, the carbon black is produced as solid particles suspended in a hot effluent gas containing carbon monoxide, hydrogen and some times acetylene. While some attempt has been made, with more or less success, to recover heat from this gas, or to burn the same, in many instances it has proved impractical to do so, and after the carbon black particles are removed from the gas by various processes known to the prior art for separating solids from gases, the gas, and much of its heat, is vented to the atmosphere and lost. The present invention recognizes for the first time that this gas contains sufficient amounts and proper proportions of gases of the right chemical composition together with sufficient heat to support an endothermic reaction with ammonia containing fluid to produce hydrogen cyanide and often acrylonitrile economically and in commercial quantities.

One object of the present invention is to provide a process of producing carbon black, acrylonitrile and hydrogen cyanide in the same process, and to separate and preserve the same from deterioration.

Another object is to provide a process for producing carbon black, acrylonitrile and hydrogen cyanide in the same process.

Another object is to provide a process for producing carbon black and hydrogen cyanide in the same process.

Further objects are to provide suitable apparatus for carrying out the above mentioned processes.

Numerous other objects and advantages will be apparent to those skilled in the prior art, upon reading the accompanying specification, claims and drawings.

In the drawings:

Figure 2 is a cross-sectional view taken along the longitudinal axis of the furnace and quench shown in Figure 1.

Figure 3 is a cross-sectional view of the apparatus shown in Figure 2 taken along the line 3—3 looking in the direction indicated.

Figure 4 is an enlarged cross-sectional view of one of the water cooled injection nozzles shown in Figures 1 to 3.

Figure 5 is a cross-sectional view of the apparatus of Figure 4 taken along the line 5—5 looking in the direction indicated.

Figure 6 is an enlarged cross-sectional view of the axial injection nozzle shown best in Figure 2.

Figure 7 is a cross-sectional view of the apparatus of Figure 6 taken along the line 7—7 looking in the direction indicated.

Figure 8 is a cross-sectional view of a uniform diameter nipple or nozzle which may be substituted for the restricted nipple or nozzle shown in Figures 4 or 6 whenever material in the gaseous state is being introduced through the same.

Figure 1:
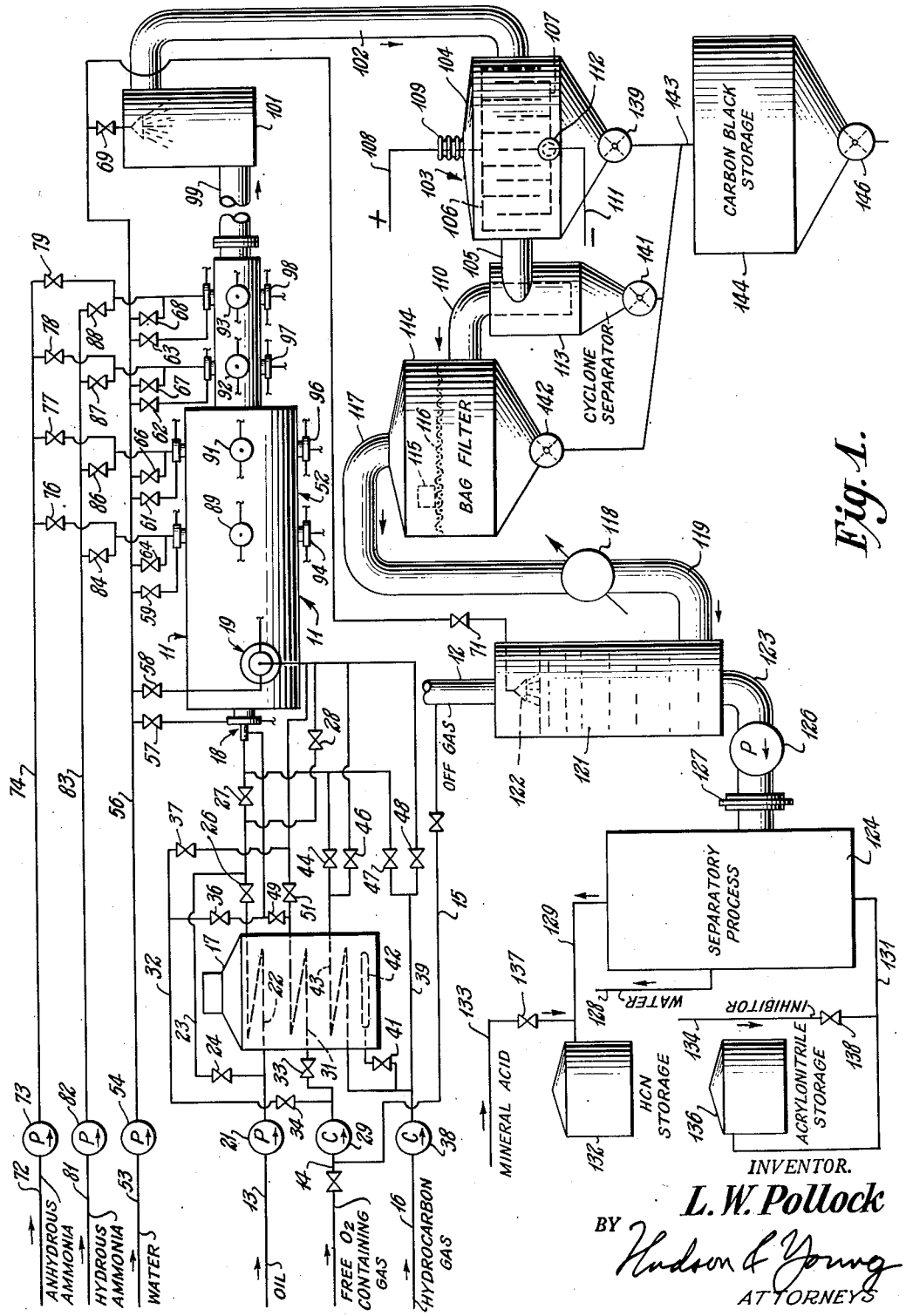
Figure 1 is a diagrammatic view of a system embodying both the apparatus and process of the present invention.

In Figure 1, numeral 11 generally designates a carbon black furnace of any known type in which particles of carbon black are produced in the form of smoke by the pyrolysis and/or incomplete combustion of carbonaceous materials, generally liquid or gaseous hydrocarbons because of cheapness and availability, and in which the effluent smoke contains substantial amounts of carbon monoxide and in some instances may also contain acetylene. There are a large number of different types of furnaces which produce carbon black smoke of this nature, and any one of these furnaces can be employed with the present invention regardless of whether there is tangential or helical movement of gases in the furnace, or any other specific feature. Of course, all these processes obviously do not produce the same quality of carbon black, and as carbon black is one of the important products of the present invention, naturally it is preferred to employ a furnace which will produce carbon black of high quality, which will sell for a relatively high price per pound. Therefore, for purposes of illustration furnace 11 most closely resembles that of Krejci 2,564,700 of August 21, 1951, because that furnace will produce high quality carbon black which is readily salable at a relatively high price, but it is obvious that one may employ any of the carbon black furnaces of the prior art which produce a hot smoke containing carbon black and carbon monoxide provided one is satisfied with the financial return that can be made from the overall products of the process including the carbon black produced.

The feed to furnace 11 may comprise any carbonaceous material, but preferably comprises any hydrocarbon fluid at least after preheating, such as oil or gas, or both oil and gas, along with a free oxygen containing gas. Usually this free oxygen containing gas is air but there are advantages to using oxygen alone, oxygen enriched air or a synthetic atmosphere of air, oxygen enriched air, or oxygen with a gaseous diluent such as carbon monoxide, or carbon dioxide, or hydrogen, or mixtures of these, one source for such diluent gas being the off gas from flue 12, a portion of which may be added through line 15 to the contents of line 14 going to compressor 29, with, or without, the removal of carbon dioxide from the gas in line 15 (not shown herein, but disclosed in my copending application Serial Nos. 168,989 filed June 19, 1950, now abandoned, and 355,834 filed May 18, 1953.

The fluid hydrocarbon need not be pure hydrocarbons, as various oxygenated, nitrogen, sulfur, or other element substituted hydrocarbons of a considerable range may be employed such as molten camphor, alkyl sulfides, etc., provided carbon monoxide and carbon black containing smoke is formed, but economically hydrocarbons are cheaper and more readily available. When the hydrocarbon is a gas it may be methane, ethane, propane, butane or pentane, or unsaturated hydrocarbons of similar carbon chain length, or mixtures of the same, and when the fluid hydrocarbon is an oil, it can be any oil starting with pentane and proceeding to the heaviest oil, wax, tar, or asphaltic material than can be pumped in a heated condition and sprayed into the furnace. When the quality of the carbon black is considered, however, it is preferred to introduce a refractory aromatic-containing gas oil, which has preferably come from a cracking process, into furnace 11 axially in a substantially vaporous or gaseous state, and to introduce tangentially into the furnace 11 a combustion supporting and burning mixture of air and methane in such proportions as to result, at least when the axial vapors are added, in incomplete combustion. As pointed out above, such preferences is on the basis of the quality of carbon black produced, as the amount and quality of hydrogen cyanide and/or acrylonitrile produced from the hot gas of the smoke has no relation to the quality of the carbon black contained therein, although it is believed that the quality and/or the yield of the carbon black is improved by the presence of the ammonia injected into, and/or hydrogen cyanide formed in said furnace 11.

While it is preferred, for reasons of carbon black quality to operate furnace 11 in the manner taught in, and with the feed taught in Krejci 2,564,700 of August 21, 1951, this process may be varied considerably as pointed out above, and Figure 1 provides means for so varying said process. It is, of course, unnecessary to elaborate on the preferred process of said Krejci Patent 2,564,700, because that patent describes it in great detail. As to the modified processes, Figure 1 supplies liquid hydrocarbon, or oil through pipe 13, free oxygen containing gas through pipe 14, recycled off gas through pipe 15, and hydrocarbon gas through pipe 16, and each of these materials may be used, or not used, may be preheated in preheater 17, may bypass the heater, and then in either cold or preheated form, or a blend of the preheated and unpreheated portions, may be injected axially into furnace 11 through injection means generally designated as 18, or may be injected radially (not shown) or tangentially (as shown) into furnace 11 through injection means generally designated as 19.

The oil in line 13 is pumped by pump 21 partly or wholly through either or both heating coil 22 or bypass 23 depending on the adjustment of valves 24 and 26 and then is injected into furnace 11 by either or both of injectors 18 or 19 depending on the position of valves 27 and 28.

In a similar manner the free oxygen containing gas, as defined as to composition above, in line 14 is pumped by compressor 29 through heating coil 31 or bypass 32, or both, depending on the position of valves 33 and 34 and then is injected into furnace 11 through injectors 18 and/or 19 depending on the position of valves 36 and 37, with or without the addition of recycle gas from line 15.

In a similar manner hydrocarbon gas in line 16, of the composition defined above, is pumped by compressor 38 into manifold 39 from which some may be withdrawn through valve 41 to supply fuel to burner 42 for heating preheater 17. Preheater 17 is heated with gas as shown, because this is generally the cheapest way to heat the same, but of course, preheater 17 could be heated by oil 13, electrical heating units, coal or steam (all these alternatives are not shown). Gas from manifold 39 can pass through preheater coil 43 into furnace 11 through injector 18 if valve 44 is opened and/or into injector 19 if valve 46 is opened, and/or the gas or a portion of it can bypass the heater through manifold 39 and be supplied to injector 18 through valve 47 and/or to injector 19 through valve 48.

In a similar manner, the free oxygen containing gas which passes through preheater coil 31 can be added to injector 18 through valve 49 and/or to injector 19 through valve 51.

Those skilled in the production of carbon black will know roughly about how much of each ingredient they wish to employ, and then can improve the operation of the process by making minor adjustments of the various ingredients and observing the results, being primarily guided by the teaching of the prior art as evidenced by the various patents mentioned in this specification, bearing in mind, however, that the process is being conducted for the production of hydrogen cyanide and/or acrylonitrile as well as carbon black, and therefore, adjustments which reduce the amount or quality of carbon black are still of value provided they result in the production of enough more, or better quality, hydrogen cyanide and/or acrylonitrile, to offset the value of the lost carbon black, such as by increasing the carbon monoxide, hydrogen, nitrogen and/or acetylene content of the effluent gases passing from furnace 11 into the quench section generally designated as 52.

It is obvious that while oil from line 13, or hydrocarbon gas from line 16, may either, or both, be used at either, or neither, of injectors 18 and 19, that free oxygen containing gas must be used at least in one of injectors 18 or 19 in sufficient quantity to produce a suitable amount of carbon monoxide in order to support the hydrogen cyanide reaction, and of course, the conditions must be also such as to produce some acetylene, if acrylonitrile production is desired in order for a further reaction to take place between the hydrogen cyanide and the acetylene to form acrylonitrile.

In order to cool various portions of the apparatus, and also to cool the reaction steps of the process itself, water from pipe 53 is pumped by pumps 54 through line 56. While such water cooling is not essential, it is desirable in order to increase the life of the inlet ports and reduce carbon deposition and general wear and tear on the apparatus, to have all the injection port means water jacketed, and by opening one or more of valves 57, 58, 59, 61, 62 and 63, water can be run through the respective water jackets.

Also by opening any one of valves 64, 66, 67, 68, 69 and 71 water may be sprayed directly as a coolant or quench, into the carbon black smoke, or hot gas, at the point of injection connected to the respective valves.

The present invention contemplates the use of any ammonia containing fluid, preferably in liquid form, and preferably selected from the group consisting of anhydrous and aqueous ammonia. The anhydrous ammonia in line 72 may be pumped in liquid, or compressed in gaseous form, by pump 73 and passed through pipe 74 into any one or more of a number of injection points controlled respectively by valves 76, 77, 78 and 79, and/or hydrous or aqueous ammonia from line 81 may be pumped by pump 82 through line 83 into one or more injection points depending on the position of valves 84, 86, 87 and 88.

Quenching can be done with ammonia vapor, but it is preferred to use liquid to get cooling by vaporization of liquid.

Only two tangential injectors 19 are shown, although any number from one to one hundred may be employed, and when so employed, they are all similarly connected to the supply lines, and the same is true of quenches 89, 91, 92, 93, 94, 96, 97 and 98 and those that don't show in Figure 1 on the other side of the quench section 52, such as 100 of Figure 2 all of which are connected up by similar pipes to supply lines 72, 81 and 53.

It is thus seen that either water, hydrous ammonia, anhydrous ammonia, or any mixtures of the same, may be injected at a number of the quench points, and the same, or a different composition may be injected at other quench points, or the quenching may be done at one point and the other quenches shut off to vary the conditions and attain the maximum yields with the type feed stream used.

The effluent smoke passes from the quench section 52 through a conduit 99, which may be short or long as desired, in which a certain amount of indirect heat exchange with the atmosphere occurs, which may be supplemented by further cooling in cooling tower 101 if desired before the smoke passes through conduit 102 into the carbon black separation system generally designated as 103.

Separation system 103 can be any dry system of separating carbon black particles from smoke known to the prior art. However, for purposes of illustration, one such system has been selected, comprising an electrical precipitator, or agglomerator 104 in which the smoke is passed between electrodes, or baffles 106 and 107 charged to opposite polarities. For example, electrode 106 is shown charged positively by wire 108 passing through insulator 109, which insulator may also support electrode 106 physically, and electrode 107 is shown negatively charged by wire 111 passing through insulator 112 which may also support electrode 107 physically. However, these polarities may be reversed, or one of the electrodes grounded to the housing 104, and of course, alternating current can be used without departing from the present invention. In fact other types of agglomerators, such as sonic, or siren agglomerators (not shown), can be used in place of precipitator 104, or no agglomerator or precipitator at all is necessary if the smoke is run through enough cyclone separators, such as 113, placed in series.

However, when some type of agglomerators 104 are employed, a single cyclone separator 113 is often enough, although it is still desirable in some instances to have two or more cyclone separators in series. If enough cyclone separators are used in series the carbon black content of the smoke may be so reduced that it is unnecessary to employ further separation means, but it is preferred to use a bag filter 114 as the final clean-up means.

Bag filter 114 contains a bag or other fabric or mechanical filtering means 116 which substantially removes the remaining carbon black. This bag may be shaken from time to time by electric motor driven vibrator 115. The effluent gases from the carbon black separation system 103 passes through conduit 117 and may or may not be further cooled at 118 if desired and then passed through conduit 119 into a water wash tower 121 preferably containing packing material of the usual type old in the art providing baffles where the gases are thoroughly contacted with water from spray 122 controlled by valve 71. The water from spray 122, together with all the contacted and absorbed hydrogen cyanide and acrylonitrile, is pumped through pipe 123 into a separatory process 124 by pump 126. At that time there should not be any substantial amount of carbon black in the same, but if there is it can be separately removed in the separatory process, or it can be collected by passing the liquid through a simple cloth, or other well known mechanical filter 127, on its way to the separatory process 124, because the amount of carbon black at this point is so small the filter 127 will only have to be changed occasionally.

As there are a number of separatory processes known for separating water 128, hydrogen cyanide 129 and acrylonitrile 131, no particular one is shown, although obviously simple fractional distillation, and other well known and more complicated processes are available. While not necessary if the hydrogen cyanide is to be used in a reasonable time, if the hydrogen cyanide is to be stored in tank 132, it is necessary to add a minor but effective stabilizing amount preferably from 0.01 to 0.1% by weight preferably of a suitable free mineral acid selected from the group consisting of sulfuric, hydrochloric and nitric acid 133 to the hydrogen cyanide to prevent decomposition and polymerization of the same during storage, although any acid tends to stabilize hydrogen cyanide, just as any base tends to break the same down.

In a similar manner unless acrylonitrile 131 is to be used immediately, it is desirable to add a minor but effective stabilizing amount, preferably from 0.05 to 3% by weight of a suitable acrylonitrile polymerization inhibitor 134 preferably selected from the group consisting of tertiary butyl catechol, hydroquinone and sulfur to the acrylonitrile being stored in tank 136 to prevent decomposition and polymerization of the same during storage. The inhibitors are added through valves 137 and 138 respectively, which, of course, are closed when the inhibitor is not being added.

The carbon black precipitated and collected at the bottom of precipitator 104, the bottom of cyclone separator 113 and the bottom of bag filter 114 is removed through star valves 139, 141 and 142 respectively into collection system 143 where it may pass to a suitable storage bin or tank 144 from which it may be withdrawn for use through star valve 146.

Figure 2 shows a cross section of the furnace 11 and quench section 52 of Figure 1. Although the carbon black furnace may have a simple cylindrical bore (not shown) it is preferred to have a first cylindrical bore 147 of greater diameter than length followed by a second smaller cylindrical bore 148 of greater length than diameter, the radius of the first bore exceeding that of the second bore preferably by a least the diameter of tangential tunnel 154. It will be noted that injector 18 is positioned to discharge fluids axially through chamber 147 into chamber 148 while injector 19 discharges fluids radially or tangentially (shown tangentially) into chamber 147. Discharging into bore 148 of quench section 52 are injectors 94, 96, 97 and 98 already so numbered in Figure 1 and injectors 149, 151, 152 and 153 which are shown in Figure 1 but which are not numbered there because of lack of space for the reference numerals (it not being necessary to have reference numerals on every part). Also injectors 100 not visible in Figure 1.

Figure 3 is a cross section of Figure 2 taken along the line 3—3 looking in the direction indicated and shows that there may be more than one tangential or radial injector 19. While injector 19 might discharge directly into the bore of the furnace it is preferable to have a tunnel or entrance conduit 154 and 156 for each of the injectors 19 communicating with bore 147. Because the temperature in the furnace is high, often being between 2000 to 3000° F., it is desirable to make the furnace out of ceramic material 157, reinforced by a metal housing 158. As metal housing 158 radiates heat readily to the atmosphere and ceramic 157 is very slow in transmitting heat, the outside of furnace 11 will be well below the melting point of the metal 158 whereas the inside may be quite hot.

Figure 4 is an enlarged cross sectional view of the injector 19. It comprises a water cooled housing 159 having a chamber 161 through which water may be circulated by means of conduits 162 and 163 connected therewith, conduit 163 preferably having an extension 164 so that it communicates with the opposite end of chamber 161 than conduit 162. While the water may move in either direction, it is preferred to connect up with conduit 163 as the inlet and 162 as the outlet.

Inside the water cooling jacket 159 is the fluid injection tube 166 which may be provided with a conical spray nozzle 167, either with, or without, a removable orifice 168.

While water cooled housing 159 is preferable, a ceramic or other heat insulating body may be substituted for the same in some instances. Or a solid metal body can be used and replaced when necessary.

As Figure 5 is a simple cross section of Figure 4, it is not necessary to describe the same further.

Figure 6 is an enlarged cross sectional view of injector 18 of Figure 2. It comprises a water cooled housing 169 having a water chamber 171 therein, in fact, it is very much like injector 19 of Figure 1 except that injector 18 has a passage 172 for oxygen containing gas between the water cooling housing 169 and the fluid injector tube 173. Similar to corresponding parts 162, 163 and 164 of Figure 4, Figure 6 has conduits 174, 176 and 177 connected in communication with chamber 171 and there is an inlet conduit 178 for oxygen containing gas which feed the same into an annular housing 179 communicating with space 172. Tube 173 has a bore 181 for the passage of fluid and a removable orifice 182 and a removable conical spray head 183 may be employed to aid in spraying the fluid into the furnace if desired. On the other hand, if the fluid passing through bore 181 is gaseous, or in a very readily vaporizable state so that it will vaporize upon a slight amount of heating, then it is feasible to pass it through a simple tube and spray nozzle 183 and orifice 182 of Figure 6 or 167 and 168 of Figure 4 may be removed and the simple nipple 184 of Figure 8 substituted in place thereof.

As Figure 7 is a simple cross section of Figure 6 no further discussion is necessary.

*Example*

A refractory aromatic-containing gas oil from a cracking process, and methane, selected from streams 13 and 16, and the free oxygen containing gas comprising air, or oxygen from stream 14, is incompletely burned in carbon black furnace 11 to form an effluent smoke having a temperature of 2000–3000° F., said smoke when quenched with water spray to 1200° F., air cooled to 700° F., and quenched with water spray to 500° F. comprising carbon black solid particles suspended in a gas comprising in volume percentage, when the free oxygen containing gas is substantially pure oxygen, from 20 to 35% hydrogen, 10 to 18% carbon monoxide, 1 to 5% carbon dioxide, 0.5 to 3% methane, 0.5 to 3% acetylene, zero to 2% nitrogen and 45 to 55% water vapor; when the free oxygen containing gas is air, from 5 to 10% hydrogen, 5 to 9% carbon monoxide, 2 to 4% carbon dioxide, 0.2 to 0.6% methane, 0.3 to 2% acetylene, 32 to 44% nitrogen and 40 to 50% water vapor; and an intermediate proportional percentage of each depending on the proportion of oxygen when the free oxygen containing gas is a synthetic mixture. Said smoke is cooled in quench section 52 to a temperature of 1000 to 1600° F., at least in part by direct heat exchange and intimate mixture with a spray, from 89, 91, 92 and 93 and all the other quench injectors shown of aqueous ammonia 81 in an amount providing from 10 to 50 volumes of ammonia vapor in passage 148 per 100 volumes of carbon monoxide therein. The resulting gases are then cooled to a temperature of 250 to 600° F. in pipe 99, spray tower 101, and pipe 102, the carbon black particles 144 are separated from said resulting gases in 102 by separation system 103 consisting of electrical precipitator 104, cyclone separator 113, and bag filter 116, all as shown in Figure 1. Said gases are then cooled in pipe 117, cooler 118, pipe 119 and water washer 121 to below about 200° F., and the hydrogen cyanide and acrylonitrile is washed out of the gases in washer 121, and the off gas 12 is discarded.

When using oxygen as the oxygen containing gas 14, it is calculated this process produces in pipe 102 in volume percentage (water vapor included in the gases) 1 to 5% hydrogen cyanide, some of which reacts with the acetylene present to form acrylonitrile so that the gas in 119 then contains 0.4 to 2.5% acrylonitrile and 0.6 to 4% hydrogen cyanide.

When using air as the oxygen containing gas 14, it is calculated this process produces in pipe 102 on the same percentage basis 0.5 to 3.5% hydrogen cyanide, some of which reacts with the acetylene present to form acrylonitrile so that the gas in 119 then contains 0.2 to 1.5% acrylonitrile and 0.3 to 2% hydrogen cyanide.

Gases at any point in the process are poisonous, as 0.3% hydrogen cyanide is rapidly fatal to men, and even 0.02% is fatal if breathed for thirty minutes. Other poisonous gases, such as carbon monoxide are also present.

The chemical reactions taking place are not fully known, and it is not necessary that they be known to obtain a patent. The net result would appear to be as follows, however:

$$NH_3 + CO \rightarrow HCN + H_2O$$

However, other reactions can occur, for example when CO is in excess this may occur:

$$NH_3 + 2CO \rightarrow HCN + CO_2 + H_2$$

The reaction forming acrylonitrile may also vary, but can be set forth as:

$$HCN + HC \equiv CH \rightarrow CH_2 = CHCN$$

The carbon black present in the gas in 148 provides a large surface area which tends to catalyze the reactions which result in HCN and $CH_2$:CHCN. The presence of $N_2$ and especially $H_2$ in the gas in 148 reduces the tendency of $NH_3$ to decompose to $N_2$ and $H_2$ by tending to create an equilibrium effect, and aids the formation of HCN.

Minor amounts of considerably less than a total of 1% of other nitrogen substituted hydrocarbons are formed, such as picolines, piperidines, and oxygenated compounds of the same, but are removed with water 128 in the separatory process 124.

The water spray 122 removes substantially all of the hydrogen cyanide, acrylonitrile and other nitrogen substituted hydrocarbons if any are produced, through line 123, pump 126, filter 127 to separatory process 124, which separates by known means the hydrogen cyanide through pipe 129, the acrylonitrile through pipe 131, and the water and other nitrogen substituted products through pipe 128.

The operation of the separation system 103 shown for illustrative purposes is that electrical precipitator 104 causes carbon black particles to take electrical charges while passing between oppositely charged electrodes 107 and 106, which precipitates some of the carbon black into the bottom of hopper 104 where it passes through star valve 139 and collection system 13 to storage 144. The remaining smoke passes tangentially through pipe 105 into cylindrical chamber 113 where it whirls around pipe 110 and the remaining smoke passes up into the lower end of pipe 110 while a considerable amount of carbon black drops to the bottom of tank 113 and is removed through star valve 141 to storage 144. Substantially all of the remaining carbon black is filtered out of the smoke because it cannot pass through fabric 116 and therefore falls to the bottom of filter 114 and is removed through star valve 142 to storage 144.

While any acid has inhibiting value, it is preferred for hydrogen cyanide to add a minor but effective stabilizing amount, preferably 0.01 to 0.1% by weight of a suitable free mineral acid preferably selected from the group consisting of sulfuric, hydrochloric, and nitric acids through 133 to the hydrogen cyanide to prevent decomposition and polymerization of the same during storage.

Similarly, it is preferred to add a minor but effective stabilizing amount of from 0.05 to 3% by weight of a suitable acrylonitrile polymerization inhibitor preferably selected from the group consisting of tertiary butyl catechol, hydroquinone and sulfur through line 134 to prevent decomposition and polymerization of the acrylonitrile when stored in 136.

While specific embodiments of the invention have been shown and described for purposes of illustration, obviously the invention is not limited thereto.

Having described my invention, I claim:

1. The process of producing carbon black and hydrogen cyanide, comprising the steps of incompletely burning a hydrocarbon with a free-oxygen containing gas in a carbon black furnace to form an effluent smoke comprising carbon black solid particles suspended in a gas comprising hydrogen, carbon monoxide, and water vapor, said gas being hot enough for said carbon monoxide to react readily with ammonia to form hydrogen cyanide, cooling said smoke by direct heat exchange and intimate mixture with an ammonia containing first liquid and simultaneously thereby reacting substantial proportions of said carbon monoxide and said ammonia to form hydrogen cyanide vapor in said gas and thereby evaporating said first liquid into vapor in said gas, dry separating out the carbon black particles from said gas at a temperature above the dew point of said gas, cooling the remaining gas below its dew point and condensing a second liquid containing hydrogen cyanide therefrom, and separating said second liquid from said gas.

2. The process of producing carbon black, acrylonitrile and hydrogen cyanide, comprising the steps of incompletely burning a hydrocarbon with a free-oxygen containing gas in a carbon black furnace to form an effluent smoke comprising carbon black solid particles suspended in a gas comprising hydrogen, carbon monoxide, acetylene and water vapor, said gas being hot enough for said carbon monoxide to react readily with ammonia to form hydrogen cyanide and for said acetylene to react readily with said hydrogen cyanide to form acrylonitrile, cooling said smoke by direct heat exchange and intimate mixture with an ammonia containing first liquid and simultaneously thereby reacting substantial proportions of said carbon monoxide and said ammonia to form hydrogen cyanide vapor and said acetylene and hydrogen cyanide to form acrylonitrile vapor in said gas and thereby evaporating said first liquid into vapor in said gas, dry separating out the carbon black particles from said gas at a temperature above the dew point of said gas, cooling the remaining gas below its dew point and condensing a second liquid containing hydrogen cyanide and acrylonitrile therefrom, and separating said second liquid from said gas.

3. The process of claim 1 in which the first liquid is selected from the group consisting of anhydrous and aqueous ammonia.

4. The process of claim 2 in which the first liquid is selected from the group consisting of anhydrous and aqueous ammonia.

5. The process of claim 1 in which the initial temperature of said effluent smoke from said furnace is 2000 to 3000° F., the cooling and reacting of the smoke with the first liquid is from that temperature down to below 600° F., the dry separation of the carbon black is between 600 and 250° F., and the condensation of said second liquid is below 250° F.

6. The process of claim 2 in which the initial temperature of said effluent smoke from said furnace is 2000 to 3000° F., the cooling and reacting of the smoke with the first liquid is from that temperature down to below 600° F., the dry separation of the carbon black is between 600 and 250° F., and the condensation of said second liquid is below 250° F.

7. The process of claim 1 in which the amount of ammonia in said first liquid is in an amount providing from 10 to 50 volumes of ammonia vapor per 100 volumes of carbon monoxide in said smoke.

8. The process of claim 2 in which the amount of ammonia in said first liquid is in an amount providing from 10 to 50 volumes of ammonia vapor per 100 volumes of carbon monoxide in said smoke.

9. The process of producing carbon black and hydrogen cyanide, which comprises incompletely burning a hydrocarbon with a free-oxygen containing gas in a carbon black producing furnace to form an effluent smoke comprising carbon black solid particles suspended in a gas, having a temperature of 2000 to 3000° F. hot enough to readily react carbon monoxide with ammonia and a composition comprising in volume percent from 5 to 35% hydrogen, 5 to 18% carbon monoxide, 1 to 5% carbon dioxide, 0.2 to 0.6% methane, 0.3 to 3% acetylene, 0 to 44% nitrogen, and the remainder water vapor, substantially cooling said smoke at least in part by direct heat exchange and intimate mixture with an ammonia containing first liquid in an amount providing from 10 to 50 volumes of ammonia vapor per 100 volumes of carbon monoxide in said smoke to below 600° F., dry separating out the carbon black particles from said gas at a temperature above 250° F., cooling the remaining gas to a temperature below its dew point and thereby condensing a second liquid containing hydrogen cyanide therefrom, and separating said second liquid from said gas.

10. The process of producing carbon black and hydrogen cyanide, which comprises incompletely burning a hydrocarbon with a free-oxygen containing gas in a carbon black producing furnace to the form an effluent smoke comprising carbon black solid particles suspended in a gas having a temperature hot enough to readily react carbon monoxide with ammonia and a composition comprising in volume percent from 5 to 35% hydrogen, 5 to 18% carbon monoxide, 1 to 5% carbon dioxide, 0.2 to 0.6% methane, 0.3 to 3% acetylene, 0 to 44% nitrogen, and the remainder water vapor, substantially cooling said smoke at least in part by direct heat exchange and intimate mixture with an ammonia containing first liquid in an amount providing from 10 to 50 volumes of ammonia vapor per 100 volumes of carbon monoxide in said smoke, dry separating out the carbon black particles from said gas, cooling the remaining gas to a temperature below its dew point and thereby condensing a second liquid containing hydrogen cyanide therefrom, and separating said second liquid from said gas.

11. The process of producing hydrogen cyanide by quenching the hot effluent carbon monoxide and water vapor containing gas of an incomplete combustion type carbon black furnace to below 1600° F. but not below the temperature at which it will react with ammonia to produce hydrocyanic acid with an ammonia containing first liquid and simultaneously thereby reacting a substantial portion of said ammonia with said carbon monoxide in said effluent gas to produce hydrogen cyanide and also thereby evaporating said first liquid completely in said effluent gas, and then condensing and separating a second liquid containing said hydrogen cyanide from said gas by cooling said gas below its dew point.

12. The process of producing hydrogen cyanide by quenching the hot effluent carbon monoxide and water vapor containing gas containing less than 6 percent hydrocarbons of an incomplete combustion type carbon black furnace to a temperature below 1600° F. with an ammonia containing first liquid and maintaining said gas above 600° F. for a sufficient period of time to thereby react a substantial portion of said ammonia with said carbon monoxide in said effluent gas to produce hydrogen cyanide, and also thereby evaporating said first liquid completely in said effluent gas, and then condensing and separating a second liquid containing said hydrogen cyanide from said gas by cooling said gas below its dew point.

References Cited in the file of this patent

UNITED STATES PATENTS

| | | |
|---|---|---|
| 1,562,914 | Poindexter | Nov. 24, 1925 |
| 2,194,370 | Walker | Mar. 19, 1940 |
| 2,331,968 | Forney | Nov. 19, 1943 |
| 2,370,849 | Dutcher | Mar. 6, 1945 |
| 2,564,736 | Stokes | Aug. 21, 1951 |
| 2,605,174 | Krejci | July 29, 1952 |
| 2,614,119 | Nichols | Oct. 14, 1952 |
| 2,616,794 | Krejci | Nov. 4, 1952 |
| 2,682,447 | Perry | June 29, 1954 |